C. H. BOLT.
NUT LOCK.
APPLICATION FILED FEB. 21, 1917.

1,231,840.

Patented July 3, 1917.

Witnesses
Philip Lovell
Francis J. Bowell

Inventor
C. H. Bott
By D. Swift & Co.
Attorneys

UNITED STATES PATENT OFFICE.

COLUMBUS H. BOLT, OF ARTESIA, CALIFORNIA.

NUT-LOCK.

1,231,840.      Specification of Letters Patent.      Patented July 3, 1917.

Application filed February 21, 1917. Serial No. 150,117.

*To all whom it may concern:*

Be it known that I, COLUMBUS H. BOLT, a citizen of the United States, residing at Artesia, in the county of Los Angeles, State of California, have invented a new and useful Nut-Lock; and I do hereby declare the following to be a full, clear, and exact description of the invention, such as will enable others skilled in the art to which it appertains to make and use the same.

This invention relates to an improved nut lock, and one of the objects of the invention is to provide a device of this kind which is simple and in which efficient features of construction are involved.

One of the features of construction is to provide a nut mounted upon a bolt and having a pin threaded therethrough to engage a member clamped or secured by the nut and bolt, thereby preventing the nut from turning off the bolt.

A further feature of the invention is to provide a washer between the nut and the member to be clamped, said washer having a recess in its peripheral edge to be engaged by said pin.

In practical fields, the details of construction may necessitate alterations falling within the scope of what is claimed.

The invention comprises further features and combination of parts, as hereinafter set forth, shown in the drawings, and claimed.

In the drawings:—

Figure 1:
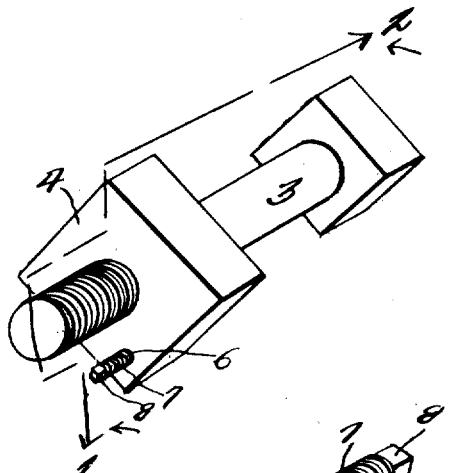
Figure 1 is a view in perspective of the improved nut lock, constructed in accordance with the invention.
Figure 2:
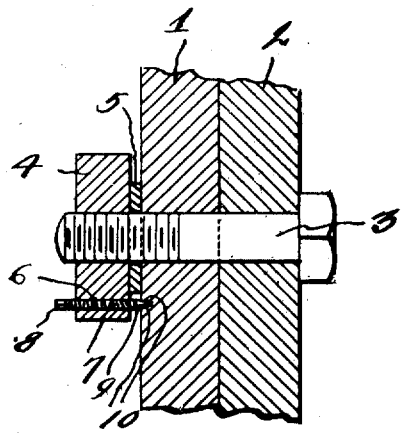
Fig. 2 is a sectional view on line 2—2 of Fig. 1, but also showing members in section to be clamped.
Figure 3:
Fig. 3 is a detail view of the threaded pin, for holding the nut in place securely.
Figure 6:
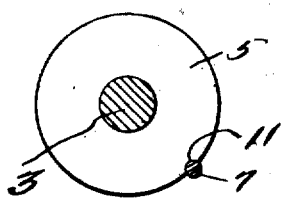
Fig. 6 is a sectional view on line 6—6 of Fig. 5, showing parts in elevation.
Figure 5:
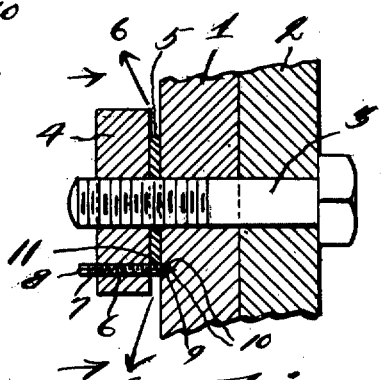
Fig. 5 is a sectional view of another form of nut lock.

Referring more especially to the drawings, 1 and 2 designate two members to be clamped or held together by means of a bolt 3 and a nut 4, which is threaded upon the bolt, as shown in Figs. 1, 2 and 5 clearly. Arranged on the bolt 3 between the nut 4 and the member 1 is a washer 5. The nut 4 is provided with a threaded opening or aperture 6, in which a pin 7 is threaded. One end of the pin has an extension 8 rectangular in cross section, to receive or be engaged by any suitable wrench or the like (not shown) for turning the pin toward the member 1. The other end of the pin is provided with a conical portion 9 having ratchet teeth 10, which, in cross section of the conical end, are arranged diametrically. In other words, there are four ratchet teeth, and each two opposite teeth are diametrically arranged. When the pin 7 is rotated toward the member 1, the conical terminal 9 of the pin embeds into the member 1, and said teeth are so arranged relative to the threads of the pin, as to prevent the pin from unscrewing, thereby preventing detachment of the nut. For instance, as long as the pin is in engagement with the member 1, as shown in Fig. 2, the nut can not be removed from the bolt. However, by applying the wrench (not shown) to the extension 8 and forcing the pin reverse to its home screwing movement, the conical extremity of the pin will become detached or disconnected from the member 1, in which case the nut 4 may be removed. In Figs. 5 and 6, the washer is provided with a recess or notch 11 in its periphery, to receive the pin, thereby preventing rotary movement of the washer. The conical extremity of the pin 7 is constructed of highly tempered case hardened steel, so that when the pin is screwed into place or home, the conical extremity constitutes means to cut its own socket into the member 1, by means of the teeth 10. In Figs. 5 and 6, the conical extremity also cuts the notch 11 in the peripheral edge of the washer.

Figures 4, 7:
Fig. 4 is a sectional view on line 4—4 of Fig. 3.
Fig. 7 is a detail view, partly in plan and partly in section, showing another means for holding the nut and washer.

In Fig. 7, the washer 5 is provided with a plurality of semi-circular scallops 11ª, and projecting from one face of the washer, is a short lug 5ª, which embeds into one of the members 1 and 2, to keep the washer from turning, until the nut 4 is screwed home against the washer. After so adjusting the nut 4, the pin 7 may be threaded through the opening 6 of the nut to engage one of the scallops, as shown in Fig. 7, and turned sufficiently so that the cutting end of the pin will cut its way enough into the member 1 as to lock the nut 4 in place, and since the nut 4 cannot be turned, it is clear that the washer 5 is held against rotation, owing to the pin 7 engaging one of the scallops. The lug 5ª, if desired, may be eliminated, for the reason that when screwing the pin 7 in place, the pin will engage one of the scallops to hold the washer.

The invention having been set forth, what is claimed as new and useful, is:—

1. In a nut lock, the combination of a bolt and a nut for securing two members together, of a pin threaded through the nut eccentrically to the bolt engaging opening of the nut, and having a conical extremity provided with a plurality of ratchet teeth conforming to and extending to the apex of the conical extremity, thereby preventing the pin from unscrewing, hence preventing removal of the nut.

2. In a nut lock, the combination of a bolt and a nut for securing two members together, of a pin threaded through the nut eccentrically to the bolt engaging opening of the nut, and having a conical extremity provided with a plurality of ratchet teeth conforming to and extending to the apex of the conical extremity, thereby preventing the pin from unscrewing, hence preventing removal of the nut, and a washer between one of the members and the nut and provided with a notch to be engaged by said pin.

3. In a nut lock, the combination of a bolt and a nut for securing two members together, of a pin threaded through the nut eccentrically to the bolt engaging opening of the nut, and having a conical extremity provided with a plurality of ratchet teeth conforming to and extending to the apex of the conical extremity, thereby preventing the pin from unscrewing, hence preventing removal of the nut, and a washer between one of the members and the nut and provided with means to be engaged by the pin.

4. In a nut lock, the combination of a bolt and a nut for securing two members together, of a pin threaded through the nut eccentrically to the bolt engaging opening of the nut, and having a conical extremity provided with a plurality of ratchet teeth conforming to and extending to the apex of the conical extremity, thereby preventing the pin from unscrewing, hence preventing removal of the nut, and a washer between one of the members and the nut and provided with a plurality of scallops on its edge, one of which to receive said pin, and a lug on one face of the washer to engage one of the members to be clamped.

In testimony whereof I have signed my name to this specification in the presence of two subscribing witnesses.

COLUMBUS H. BOLT.

Witnesses:
GEO. R. FRAMPTON,
G. FRAMPTON.